(12) United States Patent
Davis et al.

(10) Patent No.: US 6,901,438 B1
(45) Date of Patent: May 31, 2005

(54) SYSTEM SELECTS A BEST-FIT FORM OR URL IN AN ORIGINATING WEB PAGE AS A TARGET URL FOR REPLAYING A PREDEFINED PATH THROUGH THE INTERNET

(75) Inventors: Clay Davis, Austin, TX (US); Walter R. Bodwell, Austin, TX (US); Michael C. Klobe, Austin, TX (US)

(73) Assignee: BMC Software, Houston, TX (US)

( * ) Notice: Subject to any disclaimer, the term of this patent is extended or adjusted under 35 U.S.C. 154(b) by 757 days.

(21) Appl. No.: 09/710,212

(22) Filed: Nov. 10, 2000

Related U.S. Application Data

(60) Provisional application No. 60/165,103, filed on Nov. 12, 1999, and provisional application No. 60/165,102, filed on Nov. 12, 1999.

(51) Int. Cl.$^7$ ............................................. G06F 15/16
(52) U.S. Cl. .................................... 709/219; 709/228
(58) Field of Search ................................. 709/219, 228

(56) References Cited

U.S. PATENT DOCUMENTS

| | | | | |
|---|---|---|---|---|
| 5,809,250 | A | * 9/1998 | Kisor | 709/227 |
| 5,974,572 | A | 10/1999 | Weinberg et al. | |
| 6,006,260 | A | 12/1999 | Barrick, Jr. et al. | |
| 6,052,730 | A | * 4/2000 | Felciano et al. | 709/225 |
| 6,138,157 | A | 10/2000 | Welter et al. | 709/224 |
| 6,286,046 | B1 | * 9/2001 | Bryant | 709/224 |
| 6,374,300 | B2 | * 4/2002 | Masters | 709/229 |
| 6,418,471 | B1 | * 7/2002 | Shelton et al. | 709/227 |
| 6,535,912 | B1 | * 3/2003 | Anupam et al. | 709/217 |

OTHER PUBLICATIONS

International Search Report for PCT/US00/30991, Mar. 21, 2003.
Nicol, et al. "Footsteps: Trail–blazing the Web" Computer Newtworks and ISDN Systems, North Holland Publishing, vol. 27, No. 6, p. 882, Apr. 1, 1995.
Pitkow, "In search of reliable usage data on the WWW", Computer Networks and ISDN Systems, vol. 29, No. 8–13, pp. 1343–1355, Sep. 1, 1997.
Jacobs, et al. "Filling HTML forms simultaneously: CoWeb–architecture and functionality", Computer Networks and ISDN Systems, vol. 28, No. 11, pp. 1385–1395, May 1,1996.
Business Wire, "Citation," 1997.
Edge Publishing, "Edge: work group computing report," 1997.
Keynote Systems Company, "Keynote ships first real–time web site performance measurement and management solution", 1997.
Keynote Systems Company, Keynote systems clocks true speed on the internet highway at 5,000 characters per second, or only 40 kbps, 1997.

(Continued)

*Primary Examiner*—Le Hien Luu
(74) *Attorney, Agent, or Firm*—Sprinkle IP Law Group

(57) ABSTRACT

A system and method for replaying a predefined path through a set of web pages. The system and method comprises selecting in chronological order a saved request in a request history. The saved requests correspond to a set of user requests made at a web page from the set of web pages. Furthermore, the present invention comprises determining whether the saved request is a form request, and if so finding a best fit form on the web page from the set of web pages and sending a replay request to the best-fit form. If the saved request is not a form request, making the replay request to a best-fit URL.

4 Claims, 1 Drawing Sheet

OTHER PUBLICATIONS

Keynote Systems Company, "Press Releases 1997".
Know–it Software Products, "Know–it server trak", 1997.
Internet Week, "Keynote software measures internet service", 1996.
International Search Report for PCT/US00/30805 faxed Jun. 10, 2003.

"SiteScope Users' Guide—URL Transaction Monitor" [Online] Feb. 10, 1999, Freshwater Software, Boulder, Colorado, as retrieved from website: http://web.archive.org/web (2 pages).

* cited by examiner

SYSTEM SELECTS A BEST-FIT FORM OR URL IN AN ORIGINATING WEB PAGE AS A TARGET URL FOR REPLAYING A PREDEFINED PATH THROUGH THE INTERNET

RELATED INFORMATION

This application claims priority under 35 U.S.C. § 119(e) to provisional application No. 60/165,103 filed Nov. 12, 1999 entitled "System and Method for Software Simulation of A User Following A Path Through a Web Site and provisional application number, 60/165,102 filed Nov. 12, 1999, entitled "System and Method for Routing a User Through an Intermediate Web Server" both of which are hereby fully incorporated by reference.

TECHNICAL FIELD OF THE INVENTION

The present invention relates generally to web page systems and methods, and more particularly, a software system and method for replaying a predetermined web path from an intermediate server.

BACKGROUND OF THE INVENTION

As web sites become more ubiquitous, businesses are increasingly interested in setting performance goals and quality standards for their web sites. One way to achieve these objectives is to simulate a user's experience with a company web site. By simulating a user's experience, the owner of a web site can determine the integrity of links and resources in the page and rate a customer's experience against the operational goals defined by the business. Furthermore, the information technology departments of companies will be better able to track and measure critical web resources.

One way to simulate a user's path through a web site is to record all the requests made by a user at a proxy server, record additional data related to each request and open a socket to send back the exact data that was passed. This technique can be used for web sites that contain only static pages. However, an increasing number of web sites are dynamic, and a method for replaying a user's path through the web must be able to account for content such as session IDs and forms. Because dynamic content can cause a web page session to expire or change over time, simply replaying a series of requests will often result in errors being returned from the target web site.

Current methods for simulating a path through web sites do not adequately address dynamic web sites. Microsoft Web Stress Analyzer Tool was developed to stress test a web site prior to making the site available on the Internet. The Microsoft tool only supports cookie-based dynamic web site techniques but does not support other techniques, nor does it support HTTPS communication between a browser and a web site. Furthermore, the Microsoft tool requires that software be downloaded and installed on a user's computer.

SUMMARY OF THE INVENTION

The present invention provides a web path replay system and method that substantially eliminates or reduces disadvantages and problems associated with previously developed web path replay systems. More specifically, the present invention provides a system and method for replaying a predefined path through a set of web pages. The method for replaying a predefined web path includes selecting a saved request associated with a saved URL from a request history. If the saved request is a form request, the present invention can determine a best-fit form from the originating web page for which a replay request can be made. Alternatively, if the request is not a form request, the present invention selects a best-fit URL on the originating web page for which a replay request can be made. After a best-fit form or a best-fit URL is selected as a target URL, the present invention makes a replay request to the target URL.

The present invention provides substantial advantages over previously developed systems by allowing a path through a dynamic web page to be replayed.

The present invention provides yet another important technical advantage by being completely web based.

The present invention provides yet another important technical advantage by running on industry standard servers.

The present invention provides yet another important technical advantage by supporting HTTPS communications.

The present invention provides yet another important technical advantage because it does not require the user to install additional software on a user's computer.

The present invention provides a significant advantage by being able to replay a path through a substantially larger number of web pages than previously developed methods.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

For the purposes of the present invention, "content" refers to the HTML and other data returned to a user's browser by a web page in response to user's commands (e.g., when the user selects a link). "Static" content is that content returned to a user's browser which does not change over time. A "dynamic" web page represents a page that can contain different, non-preformatted content that changes over time in response to the same user's commands. A "path" is a succession of web requests in a particular order.

Figure 1:
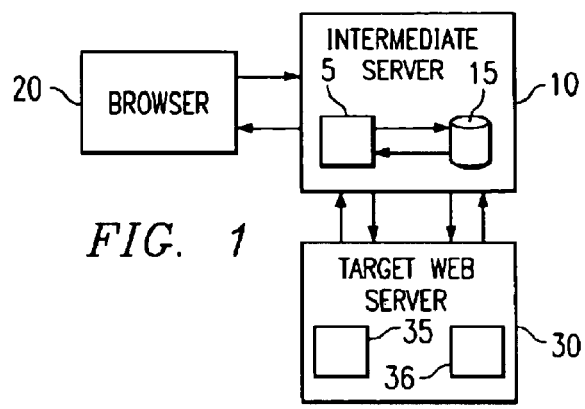
FIG. 1 is a diagrammatic representation of a system in which the present invention can record and replay a path.

The present invention provides a system for replaying a user's path through the web from an intermediate server. FIG. 1 is a diagrammatic representation of a system in which the present invention can be implemented for recording and replaying a user's path through the web. A user can access software program 5 at intermediate server 10 via web browser 20. In one embodiment, the user, after accessing software program 5 at intermediate server 10, can use web browser 20 to provide a pathname ("path 1") and a starting URL to software program 5. The path name and starting URL can be saved in database 15. The path name is used to categorize a particular path defined by the user, while the starting URL is the starting point of the user's path. Once the user indicates they are ready to begin defining a path by clicking on a "start" button, for example, software program 5 can then cause a display window to open in web browser 20. The display window is a new window in web browser 20 in which the content received in response to a user's commands will be displayed. Web browser 20 sends the request for the starting URL to software program 5 and software program 5, after saving the request in database 15, forwards the request to target web server 30. Target web server 30 will then return the content corresponding to web page 35, which is associated with the URL in the request, to intermediate server 10. Software program 5 can then mediate the content so that any additional requests made by a user from the content of web page 35 will be routed through intermediate server 10. Mediation of the content of a web page can be done according to the method disclosed in patent application Ser. No. 09/710,214, entitled "A System and Method of Mediating a Web Page" by inventors Clay Davis, Walter Bodwell and Michael Klobe, filed on Nov. 10, 2000, which is hereby incorporated by reference in its entirety.

Software program 5, after mediating the content, can then communicate the mediated content to the display window of web browser 20. From a user's perspective, the page displayed in the display window of web browser 20 can look identical to the view which would have been displayed had web the user accessed target web server 30 directly. However, the display window of web browser 20 may have been opened without navigation or status bars. This may have been done so that a user will not inadvertently circumvent the path defining process by directly entering a URL at the top of the web browser 20 rather than accessing URLs through the mediated content displayed in the display window.

As the user makes an additional request for new web page 36 (e.g. a "target web page 36"), web page 35 becomes the "originating page 35." Target web page 36 may be associated with the same target web server 30 as originating page 35 or a different target web server 30. Again software program 5 will mediate the contents of target web page 36 in response to the additional request and return the mediated contents to browser 20. It should be understood that both originating page 35 and target web page 36 are mediated. If the user makes an additional request from target web page 36, target web page 36 will be equivalent to originating page 35 for yet another target web page 36, and so on. As an example, if the "page A" was associated with the starting URL, and the user made a request for "page B" based on the mediated contents of "page A," "page A" would be originating web page 35 for target "page B." Software program 5 would mediate the contents of "page B" and forward the mediated contents to web browser 20. If the user made an additional request for "page C" from "page B", "page B" would be originating page 35 for target "page C." "Page A," "Page B" and "Page C" may be associated with the same web server, or each may be associated with a different web server. As the user enters an additional request based on the content displayed in the display window of web browser, software program 5 saves the additional request in database 15.

In addition to saving requests to database 15, software program 5 can also record content such as cookies, headers and form parameters sent with the user request or returned in the content of web page 35. In this manner, intermediate server 10 can build a request history that contains information corresponding to each request made by a user. Generally, software program 5 can save all interactions to database 15 that require a server's intervention as a "request history" for that path. When the user is done defining a path through the web, the user can stop the path defining process, and the path is saved under the path name provided by the user.

During the replay process of the present invention, software program 5 accesses the request history stored at database 15 and sends out the requests in the order they were originally made. Furthermore, software program 5 will send the appropriate headers, cookies and/or form parameters necessary for a particular web page. Target web server 30 will return the appropriate content of target web page 36, which corresponds to each request. For each additional request, target web page 36 for the previous request will become originating page 35 for the next replay request. Software program 5 will continue to send out requests from the request history until the path defined by the user is fully replayed.

Figure 2:
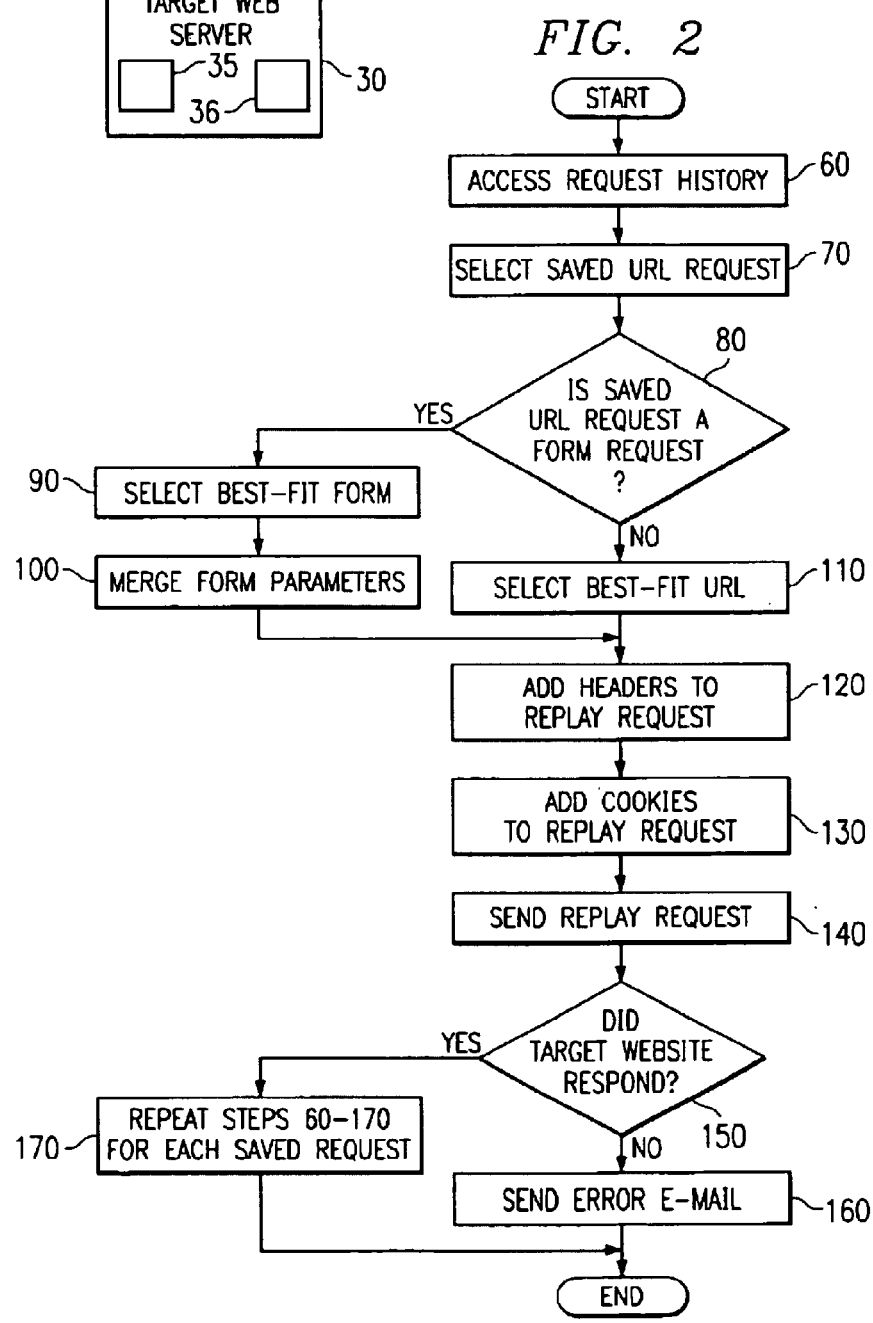
FIG. 2 is a flow chart illustrating one embodiment of the present invention for replaying a path through a set of web pages.

FIG. 2 is a flow chart showing one embodiment for replaying a predefined path through a set of web pages according to the present invention. At step 60, software program 5 can access the request history from database 15 containing such information as the starting URL, additional requests, headers, cookies, whether a form request was a POST or a GET, addresses of URLs within the content of originating page 35 and form parameters. During the first iteration of the present invention, the request corresponds to the starting URL of the user's path. Because the first request is made to the starting URL, program 5 will generally not have to send information corresponding to dynamic content. However, the additional requests may require that software program 5 send information that is dynamic in nature. From the request history stored on database 15, software program 5, at step 70, selects a saved request. The saved requests are generally selected in chronological order so that the user's path may be properly replayed.

After a particular saved request has been selected, software program 5, at step 80, can determine whether the saved request is a form request. A particular URL request can be distinguished as a form request because, in the request history stored on database 15 the URL could have been noted to be associated with a "FORM" tag. If such an association is not found, then the request will not be for a form. As shown in FIG. 2, if the saved request is a form request, the present invention performs steps 90 and 100 prior to performing step 120. If the saved request is not a form request, the present invention performs step 110 prior to performing step 120.

If the saved request is a form request, at step 90, software program 5 can determine to which form a replay request should be later made. Determining the form to which a replay request should be made can be much more involved than simply sending a replay request to the URL in the saved request. It is possible that the "current configuration," that is the configuration encountered when the path is replayed, of originating form 35 may be different than the configuration when the user originally defined the path. Furthermore, the current configuration of originating page 35 may contain more than one form to which a replay request can be made, and can even contain multiple forms sharing a common URL. In order to account for these difficulties, software program, at step 90, selects a best-fit form from the potential forms located on the current configuration of originating page 35.

The method for selecting a best-fit form depends on the form parameters that were saved when the user originally defined a path. Form parameters can be generated in several ways. First, the user will generate form parameters when they originally fill in the form. Second, form parameters can be created or modified by web browser 20 through JavaScript, based on the user's entries. Finally, form parameters can be included in the form itself with values generated by target web server 30. Form parameters generated by JavaScript or included in the form itself are often hidden from the user. The saved form parameters corresponding to a saved request will generally include form parameters filled in by the user. However, if web browser 20 replaces or changes a user submitted form parameter with a JavaScript-generated form parameter, the JavaScript-generated form parameter will be saved in the request history rather than the user-submitted form parameter. For example, if a user clicked on a check box, but JavaScript changed this to a "1," the replay request will only include the "1" when the path is replayed, and not an operation for checking the box. This is done because intermediate server 10 need only submit the parameters that will generate the appropriate response from target web server 30.

If the saved request is a form request, at step 90, software program 5 reads the tags in originating page 35 to determine if any forms match the URL in saved request. Any forms that do not include a matching URL are rejected. The order of steps for filtering out remaining forms on web page 35 depends on whether the saved request is a "POST" or a "GET." Software program 5 can distinguish a "POST" from a "GET" because the category of a form request was saved in the request history when the user originally defined the path. If the saved request is for a POST, every form in originating page 35 is rejected that does not require all the parameters that are saved in the request history and would be included in a replay request. For example, if a "name" parameter is associated in the request history with a saved request, every form on originating page 35 which does not require the "name" parameter will be rejected. If more than one potential form still remains on the originating web page, the present invention will reject all forms on web page 35 which do not contain all the hidden parameters saved in the request history for the saved request. If there is still more than one potential form left after these initial filtering processes, a form is chosen in a predetermined manner. For example, the first remaining form on the page could be chosen or a random remaining form could be chosen. It should be understood that any predetermined selection method could be used to select the best-fit form from the remaining eligible forms.

If the request is a GET, the first-pass filter of rejecting any forms which do not match the URL in saved request is the same as when the form request is a POST. However, the second and third-pass filters are transposed. With a GET, as opposed to a POST, software program 5 first rejects all forms which do not contain all the hidden parameters saved in the request history for the saved request. If more than one potential form remains on web page 35, the present invention will reject all forms that do not contain all the parameters saved in the request history that would be included in a replay request. As noted in conjunction with the POST request, forms on originating page 35 may not require all the parameters saved in the request history. If there is still more than one potential form left after the initial filters are applied, a form is chosen in a predetermined manner, as with a POST request. For example, the first remaining form on the page could be chosen or a random remaining form could be chosen. Again, it would be understood that any manner of selecting a form from the eligible forms could be used.

After determining to which form a request should be associated, software program 5, at step 100, can merge parameters from the parameters saved in the request history with parameters that appear on the form in the current configuration of web page 35. Software program 5 can determine which parameters to include in the replay form parameters by comparing how the form parameters were generated. If the user entered a form parameter, the parameter will be included in the replay form parameters, unless, as described above, the parameter was modified by JavaScript. If the form parameter was modified or generated by JavaScript at web browser 20, the JavaScript-generated parameter would be included in the replay form parameters rather than the user entered parameter. If a form parameter was submitted when the user made the original request, but the parameter was not entered by the user or generated by JavaScript, software program 5 will assume the parameter was included in the form itself. Software program 5 will then replace the form parameter originally saved in the request history with the form parameter provided in the form for the current configuration of the originating web page. As an example, a form in originating 35 may have included a session ID when the path was originally defined. If the replay request includes the form parameter saved in the request history, errors will likely result when the replay request is made. The errors may cause a "session expired" message to be returned to software program 5 and the user's path will not be property simulated. Therefore, software program 5 will replace the session ID stored in the request history with the session ID contained in the form for the current configuration of web page 35, thereby preventing an expiration error. In this manner, software program 5 can place the appropriate content into updated form fields (such as session IDs, timestamps, etc).

If, at step 80, the software program 5 determines that a saved request is not a form request, software program 5, at step 110, determines which URL link in web page 35 is a best-fit for the URL in the saved request. If the exact URL from the saved request is found in a link on web page 35, this exact URL is used in the next request. If the exact URL can not be found, the present invention determines if a non-matching URL can be found at the address on web page 35 that corresponds to the address of the URL in the original URL request.

An "address", in this context, refers to the place on web page 30 at which a saved request was originally found. When a user defined a path, software program 5, could assign a web page address to each URL requested. The addresses can be assigned based on the structure of tags and attributes in web page 35. For example, given the following page:

```
<html>
<head>
  <base href=http://www.company.com/server/home.html>
  <title>Server</title>
</head>
<body>
  <a href=first.html>Click Here First</a>
  <a href=http://www.company.com/next.html>Click Here Next</a>
</body>
</html>
```

The root of the structured page is an <html> tag. This tag contains two tags a <head> and a <body> tag. The <head> tag contains a <title> tag, and so on. This structure allows an individual attribute value on a HTML page to be assigned an address. For instance, the address of the <a> with the text "Click Here Next" is "html[0].body[0].a[1].href[0]". This address identifies the exact location of a tag or attribute on web page 35. If the exact URL from the saved request is not found on web page 35, then the URL at the corresponding address will be used. For example, if the user clicked on "Click Here Next" when defining a path web page 35, but the corresponding URL http://www.company.com/next.html could not be found, the replay request would be made to a URL located at the address of "html[0].body[0].a[1].href[0]", in web page 35. It would be understood that alternative forms of addressing can be used which yield a location within the HTML of web page 35.

Alternatively, if the exact URL in the saved request can not be found in web page 35, software program 5 can match a partial URL. For example, a partial URL match can include matching a somewhat different URL to the URL in a saved request based on the number of characters that match between the URLs.

Software program 5 can also match a URL when web browser 20, through JavaScript, modified a URL originally found in web page 35. For example, if JavaScript appended a string to a URL when the original request was made to the URL, the request with the appended string would be stored in the request history. However, when software program 5 parses the current configuration of web page 35 for the exact URL used in the saved request during replay, the URL will not be found because the string will not be present in web page 35. Software program 5 can append the string saved in the request history to the URL found at the address in web page 35 where the URL of the saved request was originally found.

In summary, at step 110, software program 5 can find a best-fit URL in several ways. Software program 5 can use an exact or partial match to select a best fit URL in the current configuration of web page 35. Software program 5 can also use a system of addresses in order to select a best-fit URL. Software program 5 may also use a combination of partial matching and addresses to select a best-fit URL, particularly when the URL in the saved request is the result of modification by JavaScript.

As shown in FIG. 2, after selecting the best-fit URL (step 110) or selecting and populating the best fit form (steps 90 and 100) software program 5, at step 120, can optionally add the appropriate headers to a replay request. Many web pages are browser dependent; that is, they return different data depending on the type of browser used. In order to accurately simulate a user's path, software program 5 sends the headers stored in the request history so that the responding web page will return the same content as if the replay request were made from the user's browser. Furthermore, if target web page 36 requires user authentication, e.g. by returning status code 401, the present invention can return a request with an authentication header. Since the simulation of the user does not involve an actual user, there is no reason to access the authentication window for target web page 36, and this window can be bypassed.

At step 130, software program 5 can determine whether cookies should be returned to target web page 36 based on the creation details of the cookie. Also, software program 5 can modify cookies so that target web page 36 will not return expiration errors. For example, if the user originally visited a web page on March 3, and a cookie was returned that had a one day expiration, the current invention could modify the cookie so that the date returned in the cookie was the current date of the path replay, say October 17, with a one day expiration. The date can be modified because software program 5 stored the creation details of the cookie in database 15 when the path was defined. Because software program 5 can modify cookies so that target web page 36 will not return errors, a user's path can be replayed through dynamic web pages at subsequent times.

After determining the appropriate target web page 36 and the data to be included, software program 5, at step 140, can make the replay request. The replay request simulates the commands that would be made by a user in order to replay the path previously defined by the user. After making the replay request to target web server 30, software program 5 determines whether or not target web server 30 responded to the replay request. If target web server 30 responded, the current configuration of target web page 36 that was returned will be used as originating page 35 for the subsequent request in the request history. Target web server 30 could, alternatively, not respond or return an error. Software program 5 may receive a "time out error" or a "page not found" error indicating that either the appropriate target web server 30 or target web page 36 was not found. If an error of this nature is received by software program 5, software program 5, at step 160, can notify the user of the error via e-mail, or other means, and terminate the playback process. If target web server 30 responds with target web page 36, software program 5, at step 170, can repeat steps 60–160 of the present invention for each saved request in the request history, thereby replaying the path originally defined by the user.

The present invention provides a system and method for replaying a predefined path that allows a path through both static and dynamic web pages to be simulated. This allows the present invention to be applied to a much greater number of web pages than previously developed methods for replaying paths through a web page.

The present invention has been described in detail, it should be understood that various changes, substitutions and alterations can be made hereto without departing from the spirit and scope of the invention as described in the appended claims.

What is claimed is:

1. A method for replaying a predefined path through a set of web pages comprising:
  selecting a saved request corresponding to a saved URL from a request history;
  if the saved request is a form request, selecting a best-fit form from a set of forms in an originating web page as a target URL, wherein selecting a best-fit form comprises rejecting a potential form if the URL of the potential form does not begin with the saved URL, if the form request is a POST, rejecting a remaining form from a set of remaining forms if the remaining form does not require each parameter that would be included in the replay form parameters if the replay request was made for the remaining form, if the set of remaining forms still contains more than one remaining form, rejecting all remaining forms from the set of remaining forms which do not require all hidden form parameters in the set of saved form parameters and if there is still more than one remaining form in the set of remaining forms, selecting a best-fit form from the set of remaining forms in a predetermined manner, otherwise choosing the one remaining form in the set of remaining forms as the best-fit form;
  if the saved request is not the form request, selecting a best-fit URL in the originating web page as the target URL; and sending a replay request to the target URL, wherein the replay request includes a set of replay form parameters, comprising a set of saved form parameters and a set of merged form parameters, wherein the set of merged form parameters includes from the current configuration of the originating web page.

2. A method for replaying a predefined path through a set of web pages comprising:

selecting a saved request corresponding to a saved URL from a request history;

if the saved request is a form request, selecting a best-fit form from a set of forms in an originating web page as a target URL, wherein selecting the best-fit form comprises rejecting a potential form if the URL of the potential form does not begin with the saved URL, if the form request is a GET, rejecting a remaining form from a set of remaining forms if the remaining form does not require all hidden form parameters included in the saved form parameters, if the set of remaining forms still contains more than one remaining form, rejecting a second remaining form from the set of remaining forms that does not require all the form parameters that would be included in the replay form parameters if a replay request was made to the second remaining form and if there is still more than one remaining form in the set of remaining forms, selecting a best-fit form from the set of remaining forms in a predetermined manner, otherwise choosing the one remaining form in the set of remaining forms as the best-fit form;

if the saved request is not the form request, selecting a best-fit URL in the originating web page as the target URL; and sending a replay request to the target URL, wherein the replay request includes a set of replay form parameters, comprising a set of saved form parameters and a set of merged form parameters, wherein the set of merged form parameters includes from the current configuration of the originating web page.

3. A system for replaying a predefined path through a set of web pages comprising:

a computer readable medium; and a set of software instructions stored on the computer readable medium operable to cause a computer to:

select a saved request corresponding to a saved URL from a request history if the saved request is a form request, select a best-fit form from a set of forms in a originating web page as a target URL, wherein the best-fit form is selected by rejecting a potential form if the URL of the potential form does not begin with the saved URL, if the form request is a POST, rejecting a remaining form from a set of remaining forms if the remaining form does not contain each parameter that would be included in the replay form parameters if the replay request were made for the remaining form, if the set of remaining forms contains more than one remaining form, rejecting all remaining forms from the set of remaining forms which do not require all hidden form parameters in the set of saved form parameters and if there is still more than one remaining form in the set of remaining forms selecting a best-fit form from the set of remaining forms in a predetermined manner, otherwise selecting the one remaining form in the set of remaining forms as the best-fit form in a predetermined manner;

if the saved request is not the form request, select a best-fit URL in the originating web page as the target URL; and send a replay request to the target URL, wherein the replay request includes a set of replay form parameters, including a set of saved form parameters and a set of merged form parameters, wherein the set of merged form parameters includes parameters from the current configuration of the originating web.

4. A system for replaying a predefined path through a set of web pages comprising:

a computer readable medium; and a set of software instructions stored on the computer readable medium operable to cause a computer to:

select a saved request corresponding to a saved URL from a request history if the saved request is a form request, select a best-fit form from a set of forms in a originating web page as a target URL, wherein the best-fit form is selected by rejecting a potential form if a target form URL does not begin with a URL corresponding the saved URL, if the form request is a GET, rejecting a remaining form from a set of remaining forms it he remaining form does not require all hidden form parameters included in the saved form parameters, if the set of remaining forms contains more than one remaining form, rejecting a second remaining form from the set of remaining forms if the second remaining form does not require all the form parameters that would be included in the replay form parameters if a replay request were made for the second remaining form and if there is still more than one remaining form in the set of remaining forms selecting a best-fit form from the set of remaining forms in a predetermined fashion, otherwise selecting the one remaining form in the set of remaining forms as the best-fit form;

if the saved request is not the form request, select a best-fit URL in the originating web page as the target URL; and send a replay request to the target URL, wherein the replay request includes a set of replay form parameters, including a set of saved form parameters and a set of merged form parameters, wherein the set of merged form parameters includes parameters from the current configuration of the originating web.

* * * * *